United States Patent [19]

Suntola

[11] Patent Number: 4,907,862
[45] Date of Patent: Mar. 13, 1990

[54] METHOD FOR GENERATING ELECRONICALLY CONTROLLABLE COLOR ELEMENTS AND COLOR DISPLAY BASED ON THE METHOD

[75] Inventor: Tuomo S. Suntola, Espoo, Finland
[73] Assignee: Oy Lohja Ab, Virkkala, Finland
[21] Appl. No.: 341,236
[22] Filed: Apr. 18, 1989

Related U.S. Application Data

[63] Continuation of Ser. No. 832,721, Feb. 25, 1986, abandoned.

[30] Foreign Application Priority Data

Mar. 5, 1985 [FI] Finland .................................. 850874

[51] Int. Cl.$^4$ .......................... G02F 1/133; G02F 1/23; H04N 9/30
[52] U.S. Cl. ..................................... 350/345; 350/333; 350/339 F; 358/58; 358/59; 340/784
[58] Field of Search .................. 358/56, 58, 241, 234, 358/59, 60, 62, 232; 313/496; 350/331 R, 332, 333, 339 F, 345; 340/716, 718, 781, 784

[56] References Cited

U.S. PATENT DOCUMENTS

| | | | |
|---|---|---|---|
| 3,531,585 | 9/1970 | Strain | 340/781 |
| 3,840,695 | 10/1974 | Fischer | 350/339 F |
| 4,090,219 | 5/1978 | Ernstoff et al. | 358/59 |
| 4,170,772 | 10/1979 | Bly | 340/781 |
| 4,319,237 | 3/1982 | Matsuo et al. | 350/333 |
| 4,573,766 | 3/1986 | Bournay, Jr. et al. | 340/716 |
| 4,591,886 | 5/1986 | Umeda et al. | 350/350 S |
| 4,618,216 | 10/1986 | Suzawa | 350/339 F |
| 4,649,381 | 5/1987 | Masuda et al. | 340/718 |
| 4,661,743 | 4/1987 | Matsuoka et al. | 313/496 |
| 4,716,403 | 12/1987 | Mozozumi | 350/339 F |

OTHER PUBLICATIONS

Brody, T. P., Juris A. Asars, and G. Douglas Dixon, "A 6×6 Inch 20 Lines-per Inch Liquid Crystal Display Panel," *IEEE Transactions on Electron Devices*, vol. ED-20, No. 11, Nov. 1973, pp. 993-1001.
Edited by A. R. Kmetz and F. K. von Willisen, "Matrix Addressing of Non-Emissive Displays," *Nonemissive Electrooptic Displays*, 1976, pp. 261-266.
Luo, F. C., W. A. Hester, and T. P. Bordy, "Alphanumeric and Video Performance of a 6"×6" 30 Lines Per Inch Thin Film Transistor-Liquid Crystal Display Panel," SID vol. 19/2, 1978, pp. 63-67.

*Primary Examiner*—Andrew J. James
*Assistant Examiner*—Tai V. Duong
*Attorney, Agent, or Firm*—Fitzpatrick Cella Harper & Scinto

[57] ABSTRACT

Described herein are a method for generating electronically controllable color elements and a color display based on the method, comprising a light gate matrix (9), and a light source system with a set of primary color sources (6, 7, 8) for the primary colors (R, G, B), and control circuits (1 . . . 4) for controlling the transmission of light gates in the light gate matrix (9) for a level corresponding to the intensity of the respective primary color in the composite color spectrum of the displayed picture element. In accordance with the invention, the primary color is generated by pulsing the primary color sources and using only one light gate per picture element for controlling the primary color intensities at the picture element. The present invention facilitates, among other things, perfect color convergence, improved light transmission efficiency, and simpler production technology for transmission type color displays, due to single light gate construction of the controlled light gate matrix (FIGS. 1a and 1b).

18 Claims, 7 Drawing Sheets

METHOD FOR GENERATING ELECRONICALLY CONTROLLABLE COLOR ELEMENTS AND COLOR DISPLAY BASED ON THE METHOD

This application is a continuation of U.S. patent application Ser. No. 832,721 filed Feb. 25, 1986, now abandoned.

The present invention provides a method in accordance with the preamble of claim 1 for generating electronically controllable color elements on the screen of a color display.

The invention also covers a color display, implemented with this technology.

The prior-art methods are covered in the following publications:

(1) R. Vatne, P. A. Johnson, Jr., P. J. Bos: A LC/CRT Field-Sequential Color Display, SID 83 DIGEST, pp. 28 . . . 29.

(2) P. J. Bos, P. A. Johnson, Jr., K. R. Koehler/B-eran: A Liquid Crystal Optical-Switching Device, SID 83 DIGEST, pp. 30 . . . 31.

(3) G. Haertling: PLZT Color Displays, SID 84 DIGEST, pp. 137 . . . 140.

(4) H. Kamamori, M. Suginoya, Y. Terada, K. Iwasa: Multicolor Graphic LCD with Tricolor Layers Formed by Electrodeposition, SID 84 DIGEST, pp. 215 . . . 218.

(5) W. A. Barrow, R. E. Coovert, C. N. King: Strontium Sulphide: The Host for a New High-Efficiency Thin Film EL Blue Phosphor, SID 84 DIGEST, pp. 249 . . . 250.

(6) Electroluminescent Displays, Report 6475, p. 83.

(7) W. F. Goede: Technologies for High-Resolution Color Display, 1982 International Display Research Conference, 1982 IEEE, pp. 60 . . . 63.

(8) T. Uchida, S. Yamamoto, Y. Shivata: A Full-Color Matrix LCD with Color Layers on the Electrodes, 1982 International Display Research Conference, 1982 IEEE, pp. 166 . . . 170.

(9) Displays, Oct. 1984, p. 212.

(10) S. Morozumi, K. Oguchi, S. Yazawa, T. Kodaira, H. Ohshima, T. Mano: B/W and Color LC Video Displays Addressed by Poly Si TFTs SID 83 DIGEST, pp. 156 . . . 157.

(11) M. Yoshida, K. Tanaka, K. Taniguchi, T. Yamashita, Y. Kakihara, T. Inoguchi: AC Thin-Film EL Device That Emits White Light, SID 80 DIGEST, pp. 106 . . . 107.

(12) J. Chevalier, J-P. Valves: CRTs With Phosphor and Impregnated Cathodes for Avionics Displays, SID 82 DIGEST, pp. 60 . . . 61.

(13) Large Screen Display Performance Comparison Chart SID 82 DIGEST, p. 107.

(14) M. G. Clark, I. A. Shanks: A Field-Sequential Color CRT Using a Liquid Crystal Color Switch SID 82 DIGEST, pp. 172 . . . 173.

(15) J. A. Roese, L. E. McCleary, A. S. Khalafalla: 3-D Computer Graphics Using PLZT Electrooptic Ceramics, SID 78 DIGEST, p. 16.

(16) SID 78 DIGEST, p. 16.

(17) GB Patent Publication 2,061,587 (M. Stolov).

(18) B. E. Rogowitz: Flicker Matching: A Technique for Measuring the Perceived Flicker of a VDT, SID 83 DIGEST, pp. 172 . . . 173.

(19) Mukao et al. (Hitachi Co. Ltd.): Nikkei Microdevices, Special Issue, Spring '85

(20) R. Blinc, N. A. Clark, J. Goodby, S. A. Pikin, K. Yoshino: Ferroelectrics, Vol. 58, Nos 1/2/3/4 (1984)+Vol. 59, Nos. 1/2 (1984).

(21) FI Patent Publication 60,333 (J. Antson et al.).

The most generally applied solution for an electronic color display is the shadow-mask tube, common in color television sets, which is based on adjacently located triads of color elements, typically excited with three electron beams (7). In such a display, the entire screen comprises a large number of these color picture elements, or color pixels. A homogeneous color perception from this kind of a color display requires sufficient viewing distance between the observer and the screen to allow the color elements of the color triad to merge in the vision of the observer into a non-discretely perceived color pixel.

Color displays based on adjacent color elements, excited by means other than the electron beam excitation, also exist. For example, the matrix-controlled fluorescent plasma display is in principle capable of generating a display equivalent to that of the shadow mask picture tube (16). These display devices are categorized as active display components, characterized with active emission of light from the color elements.

A color display with parallel control of adjacent color elements can also be formed from a light gate matrix with controllable light transmission, complemented with color filters on the light path and a light source at the rear of the display (4, 8, 10). Such a light gate matrix is generally implemented with liquid-crystal (LC) cells in which each pixel typically comprises three light cells with individual parallel control, each cell being tuned to transmit one of the primary colors via its blue, green, or red filter. Correspondingly, the light source spectrum must contain sufficient energy at all primary color wavelengths. The LC light gate matrix color display with color filters has been applied to small-size TV receivers with the advantages of low weight and low profile, compared to the conventional picture tube. One of the disadvantages of color displays with adjacent primary color light switches is the relatively low transmission efficiency, among other factors, caused by the fact that the light source emission for each primary color is effectively transmitted only via one third ($\frac{1}{3}$) of the pixel area. In practice, the effective light gate area is even smaller, due to the unavoidable lands between the light gates.

All display solutions with adjacent color elements are limited by insufficient color convergence, directly related to the relative distance between the primary color elements. This disadvantage is especially discernible in color graphic displays and other color displays where there is a need for high definition.

One solution for improved color convergence is the so-called penetration picture tube, in which the light-emitting layer on the screen of the picture tube consists of superimposed phosphor layers with different emission wavelengths for the primary colors (12). The emitted wavelength can be selected by altering the energy of the excited electron beam and therewith controlling the penetration depth to reach the phosphor layer with the desired wavelength. However, the penetration-type picture tubes do not cover the entire perceivable color spectrum. Due to the complicated control electronics of the electron beam acceleration voltage, the control functions in this kind of a picture tube are awkward. Consequently, the penetration picture tube is only used in special applications.

Another recently developed solution is a combination color display with sequential color fields of two primary colors. In this case, the picture fields for the two primary colors are generated with a single color picture tube complemented with color polarizers for color seperation and LC color separators for the selection of sequential color fields (1,14). However, the scale of hues in this display is limited to the scale of the two primary colors and their combinations. In this system, generating a color picture without flicker presupposes that the LC color separator, in this case the polarization separator, is capable of operating at a frequency of about 100 ... 120 Hz. The turn-on and turn-off times of the LC cell, described in reference (1), are about 1 ms. This is sufficient for fulfilling this requirement. The basic limitations of this solution are the restricted spectrum of colors within the combinations of the two primary color components and the high intensity loss which is due to the low transmission efficiency in the polarizer.

In a color picture projection display, the color picture is generally the addition of the separately generated primary color pictures from the primary color channels. These are combined in an optical lens system that projects the primary color pictures on a single screen (13).

The color display method according to the invention aims to eliminate the disadvantages found in the conventional solutions mentioned above and to propose a completely new method and solution for providing color control in the color elements of a display, comprising a light source system and picture elements formed by light gates.

In accordance with the present invention, the 'Synchrogate' method implements the color control of picture elements in a color display with light gates, synchronized to sequential primary color pulses, which are individually generated in the incorporated light source system. Consequently, the light gates act as transmission-controlled switches for the rear-projecting light source in the system. The transmission of a light gate is driven to proper level for the activation time of the primary color component to correspond to the intensity of the primary color component in the added color spectrum of the picture element. The primary colors are generated in the light source system as individual short pulses of colored light, sequentially pulsed at a rate which is sufficiently high for the continuous, flicker-free perception of the added color from the picture element. The 'Synchrogate' method facilitates the generation of added colors by one light gate for each pixel, providing perfect color convergence.

The Synchrogate color display in accordance with the present invention comprises in its "direct view" mode a display screen with a matrix of light-gate-type picture elements or a group of light gates, a light source system at the rear of the display for generating the primary color light pulses, and a synchronization circuit for controlling these basic elements synchronously by control circuits.

In the 'projection' mode, the Synchrogate display comprises the light source system, a light gate matrix, their control circuits, and an optical system for projecting the image, generated in the light gate system, on a separate projection screen.

More specifically, the method according to the invention is characterized by generating the primary color components (R, G, B) in a light source system as alternating light cycles, and emitting one primary color at a time, with a repetition frequency of at least 25 Hz. The color of each picture element is generated by adjusting the transmission of each light gate synchronously with the primary color emission cycle of each primary color component in the ratio required to generate the desired additive color perception. The basic sequence of each video signal light cycle is divided by the number of primary colors into a corresponding number of sequential subsequences, and each subsequence is further divided into basic operating cycles, one of which is used for transferring video signal information to each light gate, and the other is used for activating the light source system to generate a light pulse of the corresponding primary color.

Correspondingly, the color display according to the invention is characterized by a synchronization section for activating the primary colors of the light source system individually and sequentially at a repetition frequency of at least 25 Hz. Control circuits drive each of the light gates synchronously with the synchronization section so that activated primary colors provide transmitted light of an intensity proportional to the magnitude of the color component in the additive color. The light source system may include, for example, vacuum flourescent devices or similar light emitters.

By means of the invention, considerable advantages are obtained. Thus, the color convergence is inherently perfect since all basic color components are controlled by the same light gate. This cannot be achieved in any display with adjacent primary color elements. When the same light gate is used for each primary color as the controlled picture element, a triplet, in practice even greater transmission is obtained, compared to a picture element comprising adjacent color elements. This has the added advantage that each primary color source is activated only for the duration of the corresponding primary color component of the picture element. In accordance with the invention, the method provides a light transmission efficiency exceeding in triple the efficiency of displays with adjacent color elements.

The color purity or monochromaticity of a primary color generated by filtering from a continuous spectrum source is generally worse than that from a monochromatic light source. Consequently, the method according to the invention provides the additional advantage of a larger coverage of hues in the color coordinate system. Moreover, one of the advantages of the system is the reduction of individually controlled light gate elements to one third ($\frac{1}{3}$), when compared with the solution based on adjacent color elements. This simplifies the light gate matrix construction. The light gate matrix of the Synchrogate display also disposes with the color filters in the light gate matrix. Compared to the solution with adjacent light gates, the light gates in this invention are required to operate at approximately triple rate, which is, however, achievable with state-of-art light gate constructions. For instance, the light gate types indicated in references 2, 3, 15, 19, 20 have sufficient speed for this purpose.

These advantages are shown together with other advantages and characteristics in Tables 1 and 2, supplemented as appendices, in which the Synchrogate display is compared to prior-art color displays, based on the combination of a light gate and a light source. The comparison includes display solutions of reference publications (4 and 1), the former being a parallel color display with adjacent light gate elements and filters and the latter a field-sequential color display in which the alternate primary color fields are separated with a light gate. The display solution presented in reference publication (17), comprising the combination of a color-selectable light source at the rear and a light gate display, is not a functional color display but rather a monochrome display with a selection facility for display color by changing the color of the projecting light source at the rear.

The term critical flicker frequency in the comparison table in conjunction with Syncrogate and field-sequential displays refers to the repetition rate of light or picture fields, at which the human eye integrates the repetitive light or images into a continuous light or image information. In practice, the critical flicker frequency depends on the brightness, surface type, contrast, and observer-related factors of the light or image. Typically the critical flicker frequency is in excess of 25 Hz, see reference (18).

The invention will be examined in more detail in the following with the aid of the exemplifying embodiments in accordance with the attached drawings.

FIG. 8b shows the rotating color separation filter in front view for the embodiment shown in FIG. 8a.

Figure 9A:
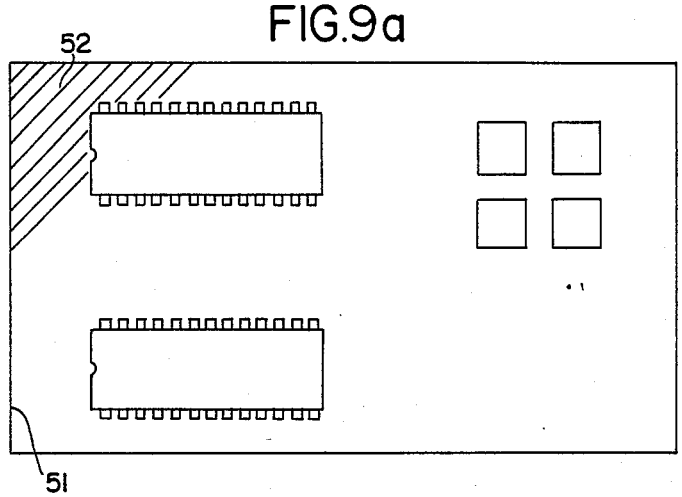
Figure 9B:
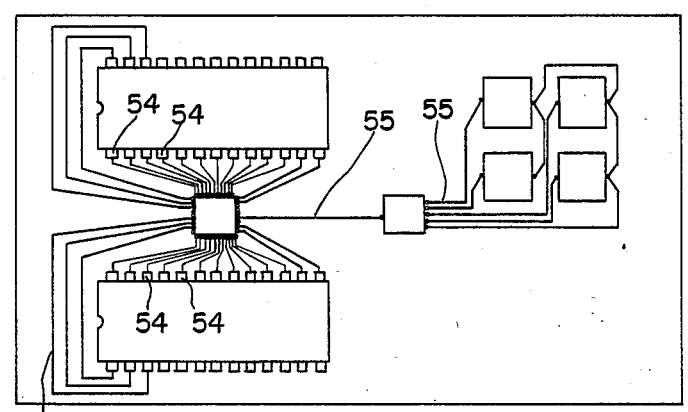
Figure 9C:
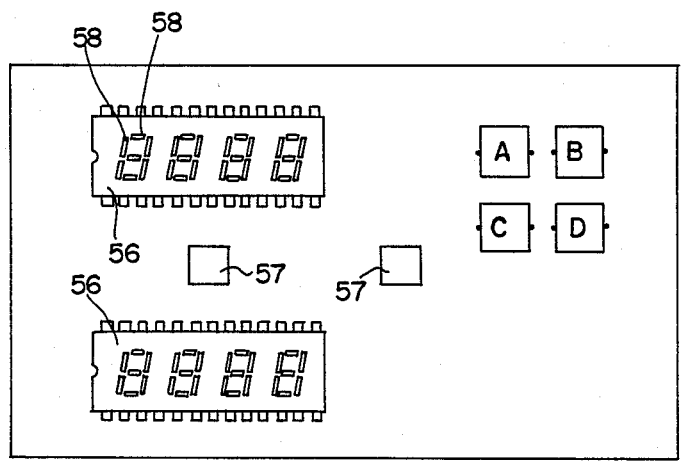

FIGS. 9a, 9b, and 9c show an embodiment in accordance with the invention for an application in a so-called hybrid display.

Figures 10A, 10B:
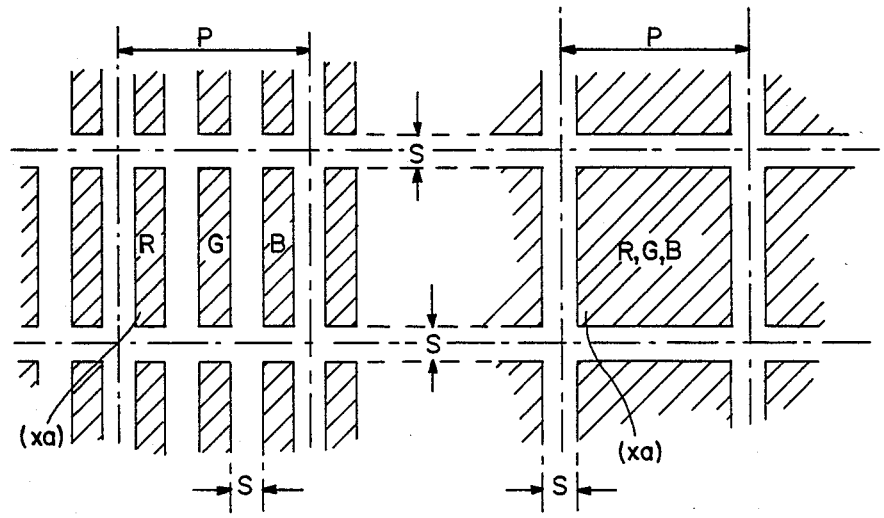

FIGS. 10a and 10b show a comparison between the areas of color elements on the display screen and associated light gates for a display with adjacent color elements and for a display in accordance with the invention, respectively.

Figure 1A:
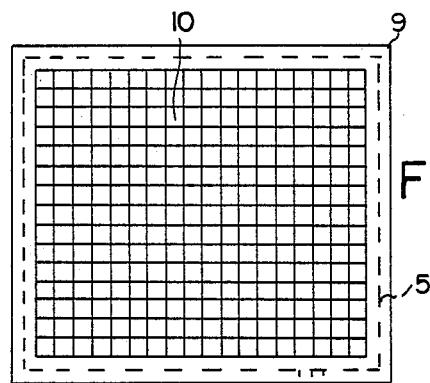
FIGS. 1a and 1b show in a front and side view one embodiment of the display in accordance with the invention.
Figure 1B:
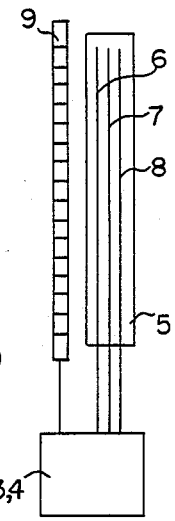

The display device implementing the method according to the invention comprises the basic components shown in FIGS. 1a and 1b: a light gate matrix 9 and a light source system 5 with primary color light sources 6, 7, and 8, and drive circuits 1 ... 4 that control the synchronous operation of the light gate matrix 9 and light sources 6, 7, 8 appropriately according to the method of the invention.

The light gate matrix 9 is implemented with light gate elements 10 that are driven during the generation of the corresponding primary color picture to a transmission level which corresponds to the intensity of displayed primary color in the picture element. A response time of about or less than 2 ms is required for the light gate element 10. A period of a few milliseconds $t_{iR}$, $t_{iG}$, $t_{iB}$ (FIGS. 3a, 3b) is available for driving the picture field information into light gate matrix 9. To achieve the highest possible efficiency, the light sources 6, 7, 8 are activated only for the time $t_{aR}$, $t_{aG}$, $t_{aB}$, during which the picture information corresponding to each primary color R, G, B is totally transferred to light gate matrix 9 and light gate elements 10 are controlled for their corresponding transmission levels.

On the basis of prior-art technology, the most straightforward solution for implementing the light gate matrix is a liquid-crystal light gate matrix driven by thin-film transistors, principally much in the same way as in prior-art light gate matrices with adjacent, color-filtered light gate elements.

Figure 2A:
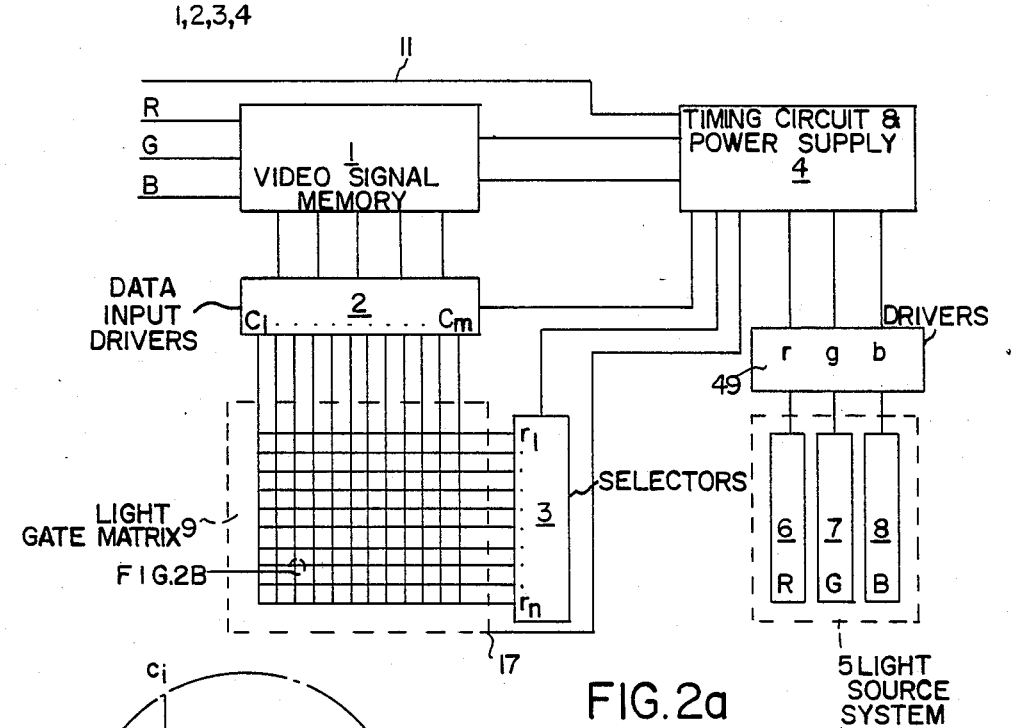
FIG. 2a shows the block diagram of an embodiment of the display in accordance with the invention.
Figure 2B:
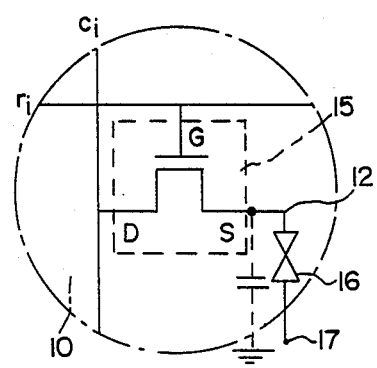
FIG. 2b shows in basic diagram form and in enlarged scale an embodiment of one liquid-crystal light gate drive circuit.

A display according to the invention can be realized using the following main blocks, shown in FIGS. 2a and 2b.

Block 1: Video signal memory for converting the input signal into serial form, compatible with the display.

Block 2: Data input drivers for controlling the light gate matrix columns $c_1 \ldots c_m$.

Block 3: Selectors for light gate matrix rows $r_1 \ldots r_n$.

Block 4: Timing circuits and power supply.

Block 5: Light source system that comprises of separately activated primary color emitting light sources 6, 7, and 8 for red, green, and blue colors, respectively.

Block 9: LC light gate matrix in which the gate elements 9 are driven by an integral thin-film transistor array.

Block 15 (FIG. 2b): The gate electrode G of a thin-film transistor 15, driving an individual light gate element 10, is connected to matrix rows $r_j$ which are controlled by the row selectors of block 3. The drain electrode D of the thin-film transistor 15 is connected to column lines $c_i$ of matrix 9, through which a data driver 2 feeds the intensity information of the corresponding element via the thin-film transistor source electrode S at point 12 to the capacitance formed by the LC element. The other electrode of the liquid crystal element 16 is a common electrode 17.

Block 49: Drivers of the light sources 6, 7, 8 in the light source system 5.

The so-called Syncrogate display according to the invention presupposes the following performance by the light gate element 10:

a. response time of $\leq 2$ ms, and
b. controllable transmission level for all primary color spectrum components.

The response requirement is best fulfilled among the prior-art solutions by PLZT light gates (3, 15) and ferroelectric liquid crystal light gates (19, 20). The $\pi$-cell (2) also complies with the response requirements. The transmission of the referred cell types is controllable by a transverse electric field across the cell for all primary color components R, G, B.

Due to a lower control voltage among other things, the LC cells have given better yield than the PLZT cells in light gate matrix constructions with a large number of cells. The best results have been achieved with LC matrices driven by thin-film transistors (TFT). In prior-art solutions, each LC element in the light gate matrix is typically driven by one TFT whose gate and drain electrodes are connected to row and column lines $r_j$ and $c_i$ of light gate matrix 9 (FIG. 2b). The drive voltage imposed via each column line $c_i$ is transferred through the channel of the TFT, which is driven conductive by the drive signal from the row selection line, to the capacitance formed by the LC cell. To increase the cell time constant, the capacitance is generally paralleled with a thin-film capacitor to achieve the 20 ms storage time, typically required for cells in adjacent color element displays. The display solution in accordance with the invention operates even with a matrix cell storage time of $\frac{1}{3} \times 20$ ms. Contrasting to this, the response time must be $\leq 5$ us as the solutions based on adjacent color element matrices typically manage with a longer response time of $\leq 30$ us.

Figure 2C:
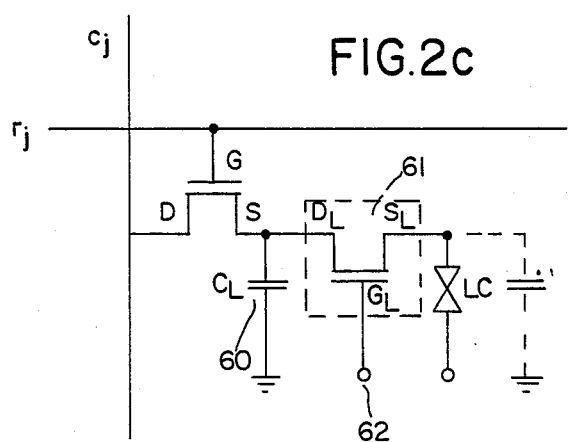
FIG. 2c shows in basic diagram form and in enlarged scale an embodiment of one liquid-crystal light gate drive circuit in conjunction with input latches.

An alternative (FIG. 2c) for a cell driven by one thin-film transistor is to include another TFT as an input latch which allows the information of the next field to be transferred into the matrix during the display of the previous field without interfering with the displayed field. The intensity signal is stored in a capacitor 60 and switched to the light gate element by switching on a thin-film transistor 61 in all primary color elements via an electrode 62.

Figure 3A:
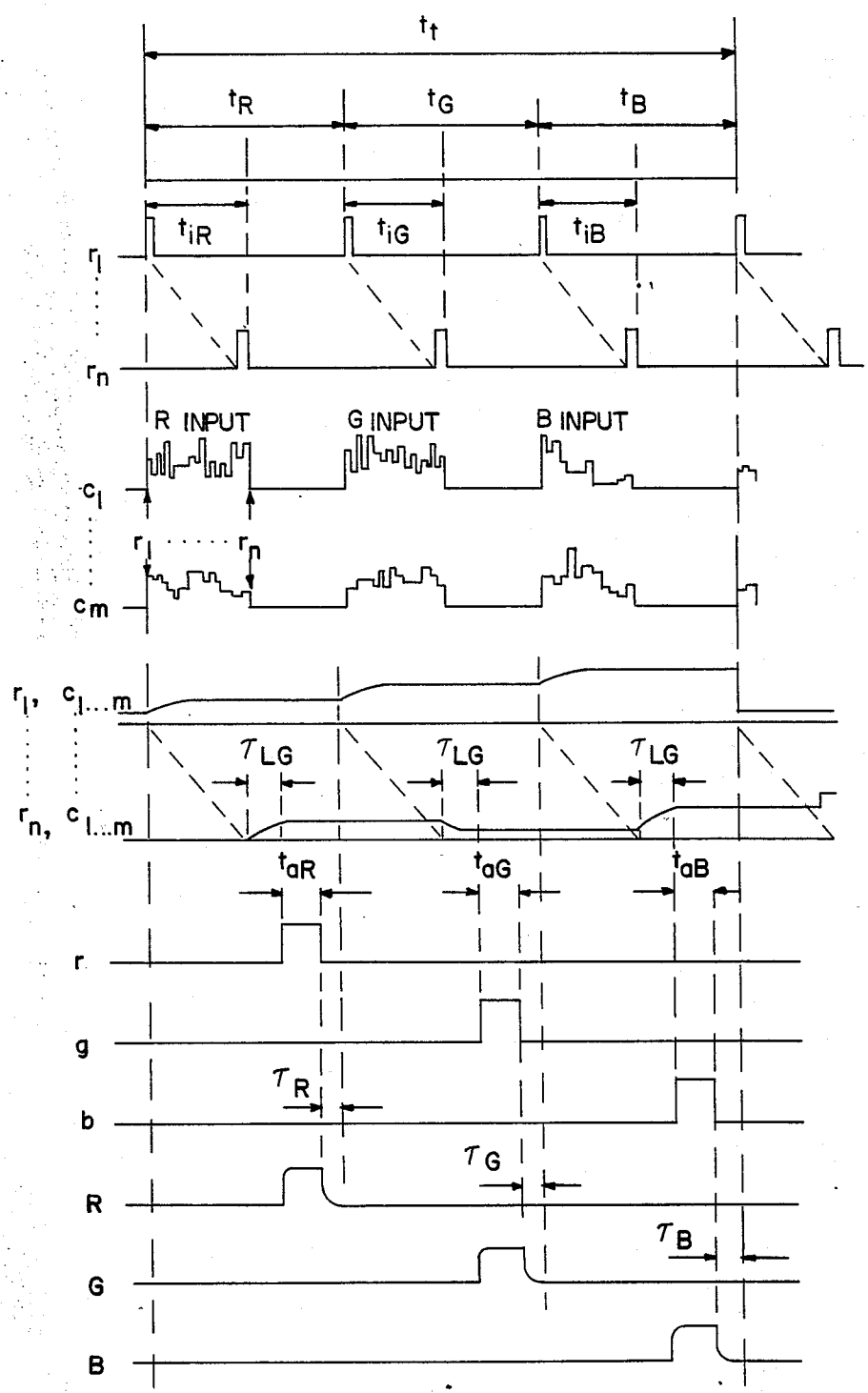
FIG. 3a shows the signal timing diagram for the different sections of an embodiment in accordance with the invention during a full horizontal scan.

FIG. 3a shows the signal timing diagram for a display according to the invention, in which the light gate matrix 9 is implemented with the so-called TFT-LC construction (FIG. 2a). The control method for matrix 9 is "line-at-time". The signal timing is controlled by a timing unit 4 which is synchronized with the input video signal.

Figure 3B:
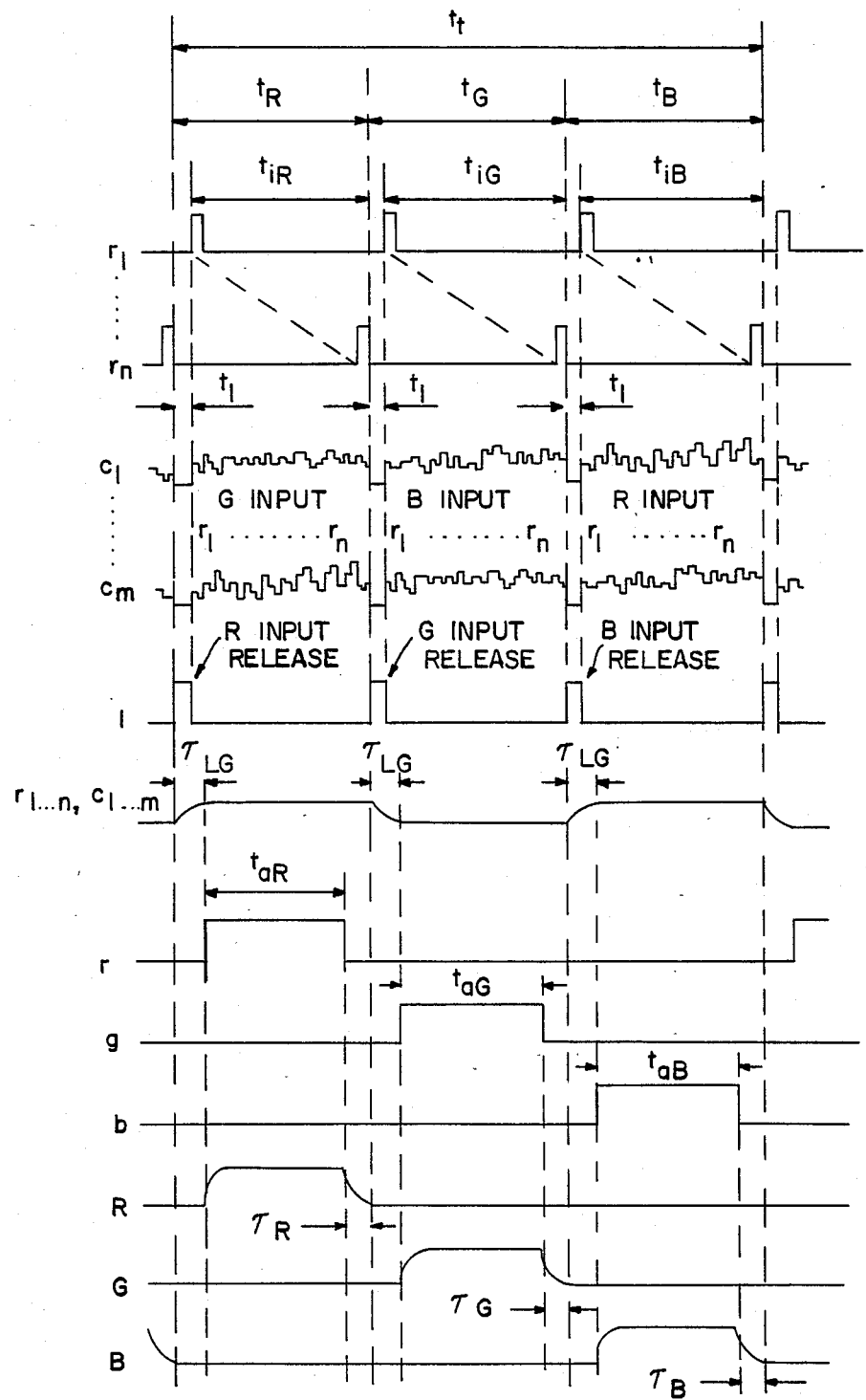
FIG. 3b shows the signal timing diagram for the different components of an embodiment in accordance with the invention during a full horizontal scan in conjunction with input latches.

The basic operating sequence $t_t$ (e.g. 20 ms) is divide by timing unit 4 into; three sequential sub-sequences $t_R$, $t_G$, and $t_B$ during which the red, green, and blue color subfields are generated. Furthermore, each of the three sub-sequences is further divided by timing unit 4 into two basic operating cycles of which the first ones $t_{iR}$, $t_{iG}$, and $t_{iB}$ transfers the video information of each subfield via column lines $c_1 \ldots c_m$ to the elements of light gate matrix 9 row ($r_1 \ldots r_n$) one at a time. The control voltages imposed on the LC elements are shown in FIG. 3a, waveforms $r_l$, $c_l \ldots c_m$; $r_n$, $c_l \ldots c_m$. The second basic cycles $t_{aR}$, $t_{aG}$, $t_{aB}$ are reserved for light source activation so that the light pulse from the red light source is generated during $t_{aR}$, the green pulse from the green light source during $t_{aG}$, and the blue pulse from the blue light source during $t_{aB}$, respectively. In addition to the basic cycles, the sub-sequences $t_R$, $t_G$, $t_B$ must reserve time for light gate state change $t_{LG}$ and light source turn-off delays $\tau_R$, $\tau_G$, $\tau_B$. FIG. 3b shows the corresponding sequences, sub-sequences, and basic cycles for a light gate matrix with input memories. In this construction, the basic cycles $t_a$ and $t_i$ may occur simultaneously. An additional sequence for the input memory enable pulse is required with a duration of the same order as the input write pulse.

The light source system 5 of the display comprises of light sources for primary colors R, G, and which are individually controlled for a pulse duration of $\leq 3$ ms.

Figure 5A:
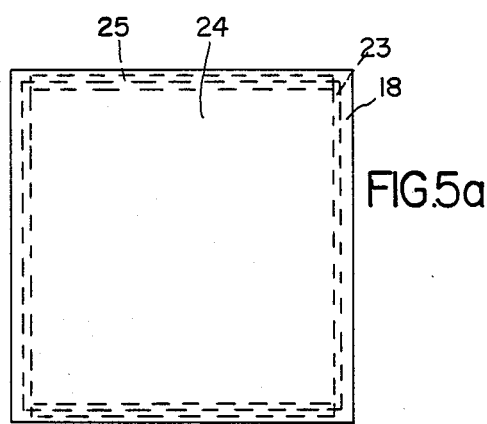
FIGS. 5a and 5b show a third embodiment in accordance with the invention as a front view and a side view, respectively.
Figure 5B:
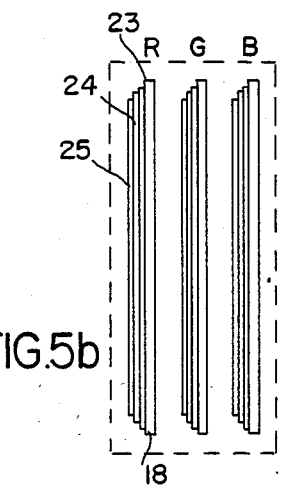

The implementation of primary color sources 6, 7, 8, which must be equally displayed to the observer, can be done using any of the several prior-art light source constructions. An optimal light source is a transparent, flat-surfaced, and low-profiled light source, emitting the primary colors R, G, and B, and permitting the location of all primary color sources 6, 7, 8 of a typical color display aligned in the observation direction. A light source fulfilling these requirements is, for example, the thin-film electroluminescent cell according to the Appendix (21), consisting of an electroluminescent construction (FIGS. 5a and 5b), produced with thin-film technology on a glass plate 18 as an electroluminescent layer 24 with transparent electrodes 23, 25.

Consequently, in this construction the electroluminescent primary light sources, or EL lamps, are located behind the light gate matrix 9, sandwiched together in the size of the light gate matrix. The EL lamps R, G, B can be driven in their resonance mode which sets lower efficiency requirements for them than in the multiplexed EL display.

Figure 4A:
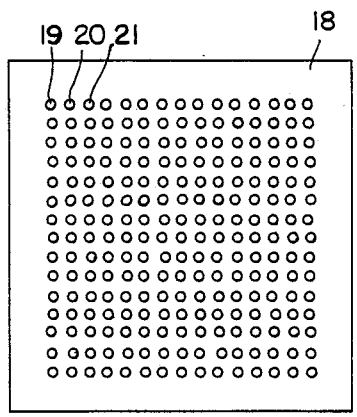
FIGS. 4a and 4b show another embodiment in accordance with the invention as a front view and a side view, respectively.
Figure 4B:
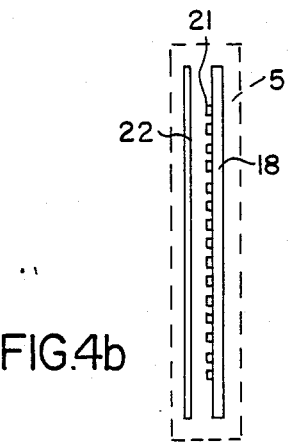

The primary color sources can also be constructed as shown in FIGS. 4a, 4b. In this implementation, the emitted light field of the adjacently or parallel located primary color sources 19, 20, 21 is homogenized by a diffuser 22, e.g. a frosted glass, between the light source and the light gate matrix. Each primary color source R, G, B is configured as a parallel controlled group of light emitting diodes, e.g. as columns 19, 20, 21.

Figure 6A:
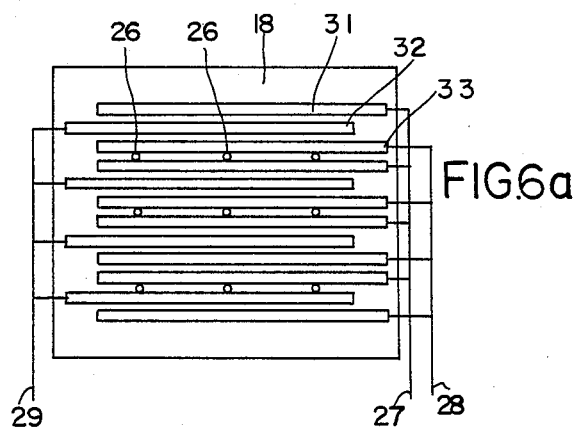
FIGS. 6a and 6b show a fourth embodiment in accordance with the invention as a front view and a side view, respectively.
Figure 6B:
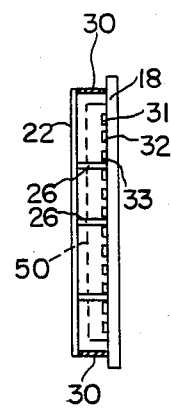

Furthermore, the light source field can be constructed as a vacuum fluorescent emitter, incorporating at a sufficient density strip- or dot-formed areas of each primary color, or a combination of these (FIGS. 6a, 6b). In this construction, fluorescent strips 31, 32, 33 are located in parallel for the primary colors R, G, B on a glass plate 18. Spaced from these strips 31, 32, 33 is a cathode structure 50. The strips 31, 32, 33 and the cathode structure 50 are enclosed in a vacuum package, comprising a diffuser plate 22, seals 30, and spacers 26. The primary-color emitting fluorescent materials are printed as narrow strips over separate anode electrodes 27, 28, 29. The selection of R, G, and B light pulses is made by anode commutation.

Figure 8A:
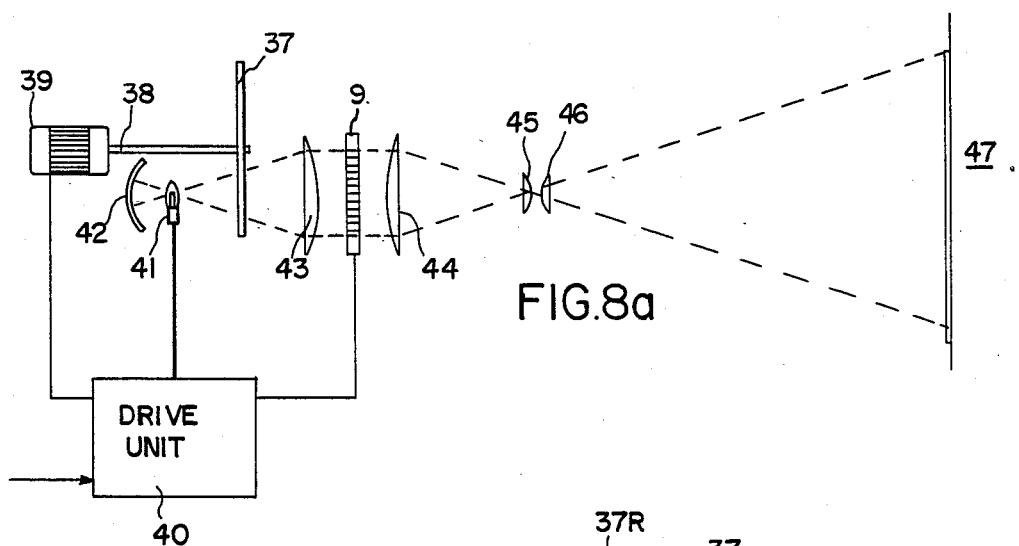
FIG. 8a shows in schematic form an embodiment in accordance with the invention for an application in projection display.
Figure 8B:
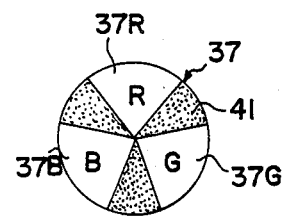

In the projector mode (FIGS. 8a, 8b), the light source 41, 42 is most easily implemented with a single white light emitting source 41, 42, e.g. a xenon gas-discharge lamp which is pulsed to improve the efficiency, and a primary color separation filter 37 on the light transmission path, rotated synchronously with the control signals of the light gate matrix 9.

The filter 37 is rotated by an electric motor 39 via a shaft 38 synchronously with a drive signal from a drive unit 40, controlling the matrix 9. The circular filter plate 37 is divided by black sectors 41 into three transparent filter sections 37R, 37G, 37B, 39, 40 for the three primary colors R, G, B, respectively. The emitted light from the light source 41 is transmitted via the color separation to a reflector 42 and therefrom via the optical light gate system 43 ... 46 as the desired color pattern on a screen 47.

Figure 7A:
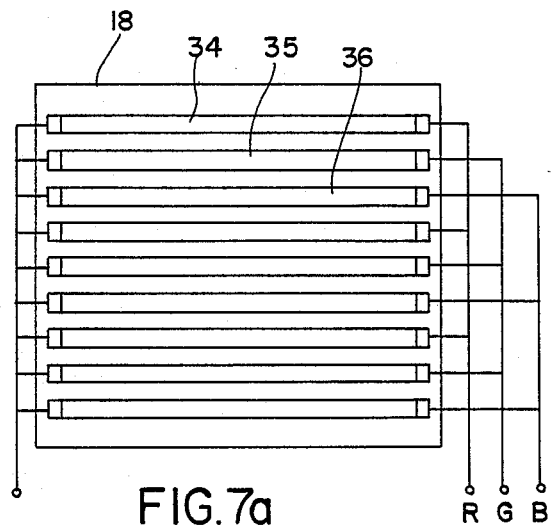
FIGS. 7a and 7b show a fifth embodiment in accordance with the invention as a front view and a side view, respectively.
Figure 7B:
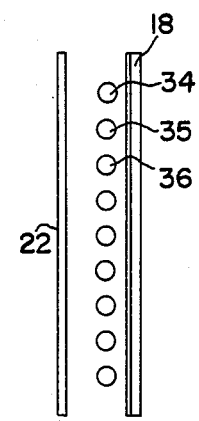

A light source construction comprising monochromatic primary color fluorescent tubes 34, 35, 36 or equivalent neon discharge tubes is shown in FIGS. 7a, 7b. The rise and decay response requirements on these light sources can be fulfilled using e.g. UV-excited lanthanide-type fluorescent materials. Also in this case, the function of diffuser 22 is to homogenize the emitting surface intensity for the light gate matrix 9.

The embodiments of the invention described above refer to implementations in accordance with the invention which are based on the use of an LC light gate matrix with integral thin-film transistor control circuitry.

When the desired picture resolution is low, the invention also covers solutions in which the individual picture elements are implemented with discrete light gate elements in a hybrid construction, possibly provided with a separate driver circuitry. This implementation allows the use of conventional integrated circuits for the control of the light gates as suggested for an instrument panel display, depicted in FIGS. 9a, 9b, 9c. The support structure in this solution for the light gate matrix is a glass plate 51. An opaque insulating material layer 52 is printed on the surface of the glass plate 51 everywhere except on the areas of the light gate elements. On top of the insulating layer 52, a conductor pattern 53 is printed. This provides the wiring from the light gate element contacts 54 to the control circuit contacts 55.

Both the light elements and the control circuits are attached to the glass plate 51, using surface-mounting technology. An individual light gate display 56 may consist of separately contacted light gate elements 58 which are driven via signal lines, attached to the light gate display edge.

If the construction is based on PLZT light gate elements, a control voltage of about 150 ... 200 V is required from the driver circuits 57. They can be of the same type as for EL and plasma displays. A driver circuit of this type typically controls 32 or 64 light gate elements.

Although the implementations described as examples of the embodiments in accordance with the invention refer to the use of three primary colors, it is clear that the scope of the invention also covers the use of, for example, two, four or even more primary colors.

TABLE 1

|  | Adjacent element display (parallel filter construction) | Field-sequential display | Synchrogate display |
| --- | --- | --- | --- |
| Light source | Combination-color emitter for primary colors | Combination-color emitting picture tube for 2 primary colors | Separate primary color emitters |
| Picture generation | In light gate matrix | At light source | In light gate matrix |
| Intensity control for primary colors | Transmission control of light gates | Pixel-level control at light gates | Transmission control of light gates |
| Separation of primary colors | Filters in light gate matrix | Color polarizers and light gate separator | Inherent in separate color sources |
| Synchronous operations | None | Light gate separator | Primary color subfields of color picture frame in light gate matrix |
|  |  | Added color picture | Primary color emitter control |
| Color spectrum | All colors within primary color spectrum | Combinations of 2 primary colors | All colors within primary color spectrum |
| Color convergence | Incomplete | Complete | Complete |

TABLE 2

|  | Adjacent element display (parallel filter construction) | Field sequential display | Synchrogate display |
| --- | --- | --- | --- |
| Number of light gates | 3 × number of picture elements | 1 | Number of picture elements |
| Response requirement for light gates | ≦20 ms | ≦3 ms | ≦2 ms |
| Control interval for a light gate | ≦30 us | ≦3 ms | ≦5 us |
| Field multiplier/primary color | $\frac{(P-S)(P/3-S)}{P^2}$ | 1 | $\frac{(P-S)^2}{P^2}$ |
|  | Refer to FIG. 10a |  | Refer to FIG. 10b |

What is claimed is:

1. A method using video signal lines for generating picture elements with individual color control on a color display screen, using at least two light gates and a common light source system for the light gates, and emitting separately at least two primary colors wherein the light source system is activated separately for each primary color to generate a switched light source that incorporates the different primary color components, and by using control circuits for controlling the transmission of each light gate to achieve the desired color intensity, said method comprising:

generating the primary color components in the light source system as alternating light cycles, and emitting one primary color at a time, with a repetition frequency of at least 25 Hz, generating each picture element color by adjusting the transmission of each light gate synchronously with a primary color emission cycle of each primary color component in a ratio required to generate the desired additive color perception; and dividing a basic sequence of each video signal line cycle by the number of primary colors to provide a corresponding number of sequential sub-sequences, and dividing each sub-sequence further into basic operating cycles $t_i$ and $t_a$, and using $t_i$ for transferring the video signal information to each light gate with the light source not activated, and using $t_a$ for activating the light source system to generate a light pulse of the corresponding primary color.

2. A color display including at least two light gates as display element, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system individually and sequentially at a repetition frequency of at least 25 Hz, wherein said light source system comprises a vacuum fluorescent construction with primary color areas for emitting the different primary colors;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate with the light source not activated, and using $t_a$ for activating the light source system to generate a light pulse of the corresponding primary color.

3. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system individually and sequentially at a repetition frequency of at least 25 Hz, wherein the light source system comprises a structure of fluorescent tubes;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate with the light source not activated, and using $t_a$ for activating the light source system to generate a light pulse of the corresponding primary color.

4. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system at repetition frequency of at least 25 Hz, wherein a diffuser is disposed in front of the light sources for homogenizing the color emitting field;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate with the light source not activated, and using $t_a$ for activating the light source system to generate a light pulse of the corresponding primary color.

5. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system at a repetition frequency of at least 25 Hz;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate, wherein the light gate elements comprise discrete components mounted on a glass plate which provides a display conductor substrate and a structural frame; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate with the light source not activated, and using $t_a$ for activating the light source system to generate a light pulse of the corresponding primary color.

6. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system at a repetition frequency of at least 25 Hz;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate, wherein the control circuits for driving an individual light gate include an input memory consisting of a thin-film transistor and a latch capacitor for transferring the picture information simultaneously to all picture elements by a signal on a common enable electrode line for all picture elements; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate with the light source not activated, and using $t_a$ for activating the light source system to generate a light pulse of the corresponding primary color.

7. A method using video signal lines for generating picture elements with individual color control on a color display screen, using at least two light gates and a common light source system for the light gates, and emitting separately at least two primary colors wherein the light source system is activated separately for each primary color to generate a switched light source that incorporates the different primary color components, and by using control circuits for controlling the transmission of each light gate to achieve the desired color intensity, said method comprising:

generating the primary color components in the light source system as alternating light cycles, and emitting one primary color at a time, with a repetition frequency of at least 25 Hz, generating each picture element color by adjusting the transmission of each light gate synchronously with a primary color emission cycle of each primary color component in a ratio required to generate the desired additive color perception; and dividing a basic sequence of each video signal line cycle by the number of primary colors to provide a corresponding number of sequential sub-sequences, and dividing each sub-sequence further into basic operating cycles $t_i$ and $t_a$, and using $t_i$ for transferring the video signal information to each light gate, and using $t_a$ for activating the light source system to generate a light pulse of the corresponding primary color;

wherein $t_a$ is delayed relative to $t_i$ so as to permit an associated light gate to change state.

8. A color display including at least two light gates as display element, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system individually and sequentially at a repetition frequency of at least 25 Hz, wherein said light source system comprises a vacuum fluorescent construction with primary color areas for emitting the different primary colors;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate, and using $t_a$ for activating the light source system to generate a light pulse of the corresponding primary color;

wherein $t_a$ is delayed relative to $t_i$ so as to permit an associated light gate to change state.

9. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system individually and sequentially at a repetition frequency of at least 25 Hz, wherein the light source system comprises a structure of fluorescent tubes;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate, and using $t_a$ for activating the light source system to generate a light pulse of the corresponding primary color;

wherein $t_a$ is delayed relative to $t_i$ so as to permit an associated light gate to change state.

10. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system at repetition frequency of at least 25 Hz, wherein a diffuser is disposed in front of the light sources for homogenizing the color emitting field;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate, and using $t_a$ for activating the light source system to generate a light pulse of the corresponding primary color;

wherein $t_a$ is delayed relative to $t_i$ so as to permit an associated light gate to change state.

11. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system at a repetition frequency of at least 25 Hz;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate, wherein the light gate elements comprise discrete components mounted on a glass plate which provides a display conductor substrate and a structural frame; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate, and using $t_a$ for activating the light source system to generate a light pulse of the corresponding primary color;

wherein $t_a$ is delayed relative to $t_i$ so as to permit an associated light gate to change state.

12. A color display, including:

at least two light gates as display elements, a light source system at the rear of the display, constructed for emitting at least two different primary colors, and control circuits for controlling the transmission of each light gate according to desired control signals, comprising an improvement wherein the color display includes a synchronization section, constructed to activate the primary colors of the light source system at a repetition frequency of at least 25 Hz;

control circuits constructed to drive each light gate synchronously with the synchronization section so that when any one of the primary color sources is in the activated state, the transmitted light intensity via the corresponding light gate is respectively proportional to the magnitude of the primary color component in the additive color, generated by the light gate, wherein the control circuits for driving an individual light gate include an input memory consisting of a thin-film transistor and a latch capacitor for transferring the picture information simultaneously to all picture elements by a signal on a common enable electrode line for all picture elements; and means for dividing a basic sequence of each cycle of light transmitted through said light gates by the number of primary colors to provide a corresponding number of sequential sub-sequences, and dividing each sub-sequence further into basic operating cycles $t_i$ and $t_a$, and using $t_i$ for transferring signal information to each light gate, and using $t_a$ for activating the light source system to generate a light pulse of the corresponding primary color;

wherein $t_a$ is delayed relative to $t_i$ so as to permit an associated light gate to change state.

13. The system of claim 1, 2, 3, 4, 5, 6, 7, 8, 9, 10, 11 or 12, characterized in that the light source system is activated separately for each of three primary colors.

14. The system of claim 1, 2, 3, 4, 5, 6, 7, 8, 9, 10, 11 or 12, characterized in that the said basic cycles occur in each sub-sequence sequentially.

15. The system of claim 7, 8, 9, 10, 11 or 12, characterized in that the said basic cycles occur in each sub-sequence simultaneously.

16. The system of claim 1, 2, 3, 4, 5, 6, 7, 8, 9, 10, 11 or 12, further comprising utilizing a light gate matrix, and transferring the video signal information to each light gate from a data input driver via column lines in parallel form for one row at a time 17. The system of claim 1, 2, 3, 4, 5 or 6, wherein each sub-sequence further includes a delay time $T_{lg}$ between $t_i$ and $t_a$ that is effective to permit an associated light gate to change state.

18. The system of claim 1, 2, 3, 4, 5, 6, 7, 8, 9, 10, 11 or 12, wherein each sub-sequence concludes with a delay period that is effective to permit an associated primary color of the light source system to become deactivated, thereby to permit a succeeding sub-sequence to commence with the light source system deactivated.

* * * * *

UNITED STATES PATENT AND TRADEMARK OFFICE
CERTIFICATE OF CORRECTION

PATENT NO. : 4,907,862

DATED : March 13, 1990

INVENTOR(S) : TUOMO SUNTOLA

It is certified that error appears in the above-identified patent and that said Letters Patent is hereby corrected as shown below:

On the title page, item [54] and in column 1, line 1, "Electronically" should read --ELECTRONICALLY--.

COLUMN 1

Line 1, "ELECRONICALLY" should read --ELECTRONICALLY--.

COLUMN 7

Line 42, "into;" should read --into--.

COLUMN 8

Line 55, "39, 40" should be deleted.

COLUMN 7

Line 41, "divide" should be --divided--.

Signed and Sealed this

Eighteenth Day of February, 1992

*Attest:*

HARRY F. MANBECK, JR.

*Attesting Officer*  *Commissioner of Patents and Trademarks*